United States Patent Office 3,703,474
Patented Nov. 21, 1972

3,703,474
ENCAPSULATION PROCESS
Hans F. Huber, Dayton, Ohio, assignor to The National
Cash Register Company, Dayton, Ohio
No Drawing. Filed Aug. 21, 1967, Ser. No. 661,822
Int. Cl. B01j 13/02; B44d 1/02
U.S. Cl. 252—316                    5 Claims

ABSTRACT OF THE DISCLOSURE

A process is provided for preparation of minute capsules wherein particles of intended internal phase material which have been dispersed individually in a liquid manufacturing vehicle are coated by a solid polymeric film-forming material. Polymeric material is precipitated from solution in the manufacturing vehicle or from solution in the intended internal phase material due to a "zone of insolubility" established at the interface between the particles and the manufacturing vehicle. The particles are either liquid droplets or solid particles having an associated liquid therewith. The novel process is utilized to encapsulate particles which are, to some degree, miscible with the manufacturing vehicle.

BACKGROUND OF THE INVENTION

Field of the invention

This invention pertains to a method for manufacturing minute capsules in a liquid manufacturing vehicle which manufacturing vehicle is miscible with material to be contained in the capsules (intended internal phase). This makes it possible to use, as capsule contents, a material which is soluble in the manufacturing vehicle. It more particularly relates to manufacture of such capsules wherein polymeric film-forming material forms on particles of the intended internal phase by, in one case, being instantly precipitated from solution in the manufacturing vehicle when the particles come into contact with the manufacturing vehicle. It further relates to manufacture of such capsules wherein either (a) polymeric film-forming material is instantly precipitated from solution in liquid particles of the intended internal phase material when the particles come into contact with the manufacturing vehicle, or (b) polymeric film-forming materials are instantly precipitated from both, liquid intended internal phase material and the manufacturing vehicle, when the two liquids come into mutual contact.

DESCRIPTION OF THE PRIOR ART

Prior encapsulation methods which utilize phase separation of capsule-wall-forming polymeric material from a liquid manufacturing vehicle have relied, generally, on one or more of three phase separation mechanisms:

(1) Introduction of a phase-separation-inducing material into a liquid manufacturing vehicle which renders certain polymeric materials insoluble therein;

(2) Insolubilization, to an extent, in a liquid manufacturing vehicle, of a capsule-wall-forming material by means of an alteration in the capsule-wall-forming material or of an alteration in the manufacturing vehicle; or (3) Formation of a complex of two or more polymeric materials, which complex is insoluble in a liquid manufacturing vehicle.

Encapsulation processes which utilize one or more of the above three mechanisms usually require that intended internal phase materials be immiscible with the manufacturing vehicle.

U.S. Pat. No. 3,155,590, which issued Nov. 3, 1964, on the application of Robert E. Miller and Jerrold L. Anderson and is assigned to the assignee herein, teaches encapsulation by utilization of the phase separation mechanism numbered (1), above. In the process of U.S. Pat. No. 3,155,590, phase-separation-inducing material is added to a solution of polymeric material in manufacturing vehicle in order to effect emergence of a liquid rich in capsule-wall-forming polymeric material. The phase-separation-inducing material of that Miller and Anderson process is dissolved in the manufacturing vehicle and is, therefore, effective in altering the solvent character of the entire body of manufacturing vehicle. Further, it should be noted that the separated phase there was disclosed as being in a liquid condition at the time of emergence.

U.S. Pat. No. 2,969,330 which issued Jan. 24, 1961, on the application of Carl Brynko and is assigned to the assignee herein, teaches phase separation of the type suggested by the mechanism numbered (2) above. The process of U.S. Pat. No. 2,969,330 teaches formation of capsule walls by in-situ polymerization of a monomeric material dissolved in droplets of intended internal phase material, which droplets are dispersed in a manufacturing vehicle immiscible therewith. The polymerized monomeric material, after undergoing a certain degree of reaction, becomes insoluble in the intended internal phase and precipitates from solution therein. The precipitated material migrates to interfacial surfaces between the droplets and the manufacturing vehicle, where, on further reaction, it becomes capsule wall material. Capsule walls made according to that Brynko invention are the result of a polymerization reaction of monomeric material, which material is supplied for polymerization from solution in the intended internal phase material.

U.S. Pat. No. 2,800,457, which issued July 23, 1957, on the application of Barrett K. Green and Lowell Schleicher and is assigned to the assignee herein, and U.S. patent application Ser. No. 585,314, filed Oct. 10, 1966 and now abandoned, in the names of Hans F. Huber and Sheldon S. Simon and assigned to the assignee herein, both teach the formation of an insoluble complex of two or more polymeric materials to form a capsule wall material as suggested by the phase separation mechanism numbered (3) above. The process of U.S. Pat. No. 2,800,457 relates to the manufacture of capsules having liquid capsule walls with at least one temperature-gelable hydrophilic polymeric material component. The liquid capsule walls are "set" by cooling.

The above-mentioned encapsulating process of Huber and Simon (United States patent application Ser. No. 585,314, filed Oct. 10, 1966 and now abandoned) utilizes, as capsule wall material, two or more polymeric materials which are capable of hydrogen bonding together to form a high-molecular-weight complex, insoluble, under certain conditions, in the manufacturing vehicle. The encapsulating process of Huber and Simon is useful in encapsulating where liquid-walled capsules are intended to retain internal phase material which is immiscible with the manufacturing vehicle. The liquid capsule walls are "set" by a change in manufacturing vehicle conditions. The inventor Huber in the Huber and Simon United States patent application is the inventor herein.

SUMMARY OF THE INVENTION

The above-noted prior processes for an masse encapsulation of minute particles suspended for manufacturing in a liquid vehicle, it has been required that intended internal phase material be immiscible with the manufacturing vehicle, and it has also been required that capsule wall material be in a liquid state at some time in the encapsulation process. A method for encapsulation has now been discovered which provides for encapsulation of particles miscible with the manufacturing vehicle and which process utilizes, as capsule wall material, polymeric material precipitated as a solid from solution in the manufacturing vehicle. Introduction of a particle of the intended internal phase into an agitated solution of the polymeric material in a liquid manufacturing vehicle solvent causes establishment of a concentration gradient extending from the pure intended internal phase liquid material, in dispersed particles of the material, to pure manufacturing vehicle solution. The polymeric film-forming material, selected to be soluble in the manufacturing vehicle and insoluble in the intended internal phase material, is precipitated from solution in the concentration gradient, which includes a "zone of insolubility," as a solid capsule wall material. Upon contact of a droplet of intended internal phase material with the manufacturing vehicle, polymeric capsule-wall-forming material is immediately precipitated about the droplet to provide a membrane barrier to dissolution of the droplet with the manufacturing vehicle. Such instantaneous polymer precipitation is necessary for practice of the invention, for, otherwise, droplets of the intended internal phase will be dissipated and dissolved in the manufacturing vehicle due to agitation forces utilized in the novel process.

While the novel encapsulation process of this invention permits encapsulation of materials which are miscible with the manufacturing liquid, thus obviating a restriction which was present in processes of the prior art, it also presents a restriction inherent in all encapsulation processes but made more apparent in the subject process. The intended capsule wall material must not be miscible with the intended internal phase material; in fact, in this invention, the intended capsule wall material must be precipitated by contact with the intended internal phase material. The system, when the capsules are formed, is unstable as a whole, and the capsule walls tends to dissolve on long standing; therefore they must be recovered from the vehicle.

An obvious exception to the above-mentioned restriction exists in a case wherein the capsule-wall-forming polymeric material is precipitated irreversibly from solution in the intended internal phase material. Precipitation of polymeric material to form capsule walls then occurs from wthin the particle of internal phase.

Ordinarily, particles of intended internal phase material dispersed in the manufacturing vehicle begin to dissolve, and, in dissolving, the above-mentioned concentration gradient is established, which exists, for a time, as a "zone of insolubility" for the polymeric material. When polymeric material is present in the "zone of insolubility" which surrounds each particle of intended internal phase material, it is precipitated to form capsule walls.

An object of this invention is to provide a method for encapsulating particles of intended internal phase material in a manufacturing vehicle which ordinarily is miscible with said material.

Another object of this invention is to provide a method for encapsulating particles of intended internal phase material suspended in a manufacturing vehicle wherein polymeric film-forming material is precipitated from solution in the manufacturing vehicle, in situ, on the particles, to form solid capsule walls around the particles.

Another object of this invention is to provide a method for encapsulating particles of intended internal phase material suspended in a manufacturing vehicle wherein polymeric film-forming material is precipitated by the particles from solution in the intended internal phase material to form solid capsule walls, each particle acting to cause its own wall material to form, whereas in the prior art the wall material was formed apart from the capsules, except in Brynko United States Pat. No. 2,969,330, where polymerization was involved.

Another object of this invention is to provide a method for encapsulating particles of intended internal phase material suspended in a manufacturing vehicle wherein polymeric film-forming materials precipitate, on mutual contact in the solution combination of the intended internal phase material and the manufacturing vehicle, to form capsule walls.

The process of the subject invention includes, in one embodiment, the steps of providing an agitating liquid system of polymeric film-forming material dissolved in a manufacturing vehicle and introducing intended internal phase material into the liquid system by units and not by dispersion. The intended internal phase material must be at least partially miscible with the manufacturing vehicle and must be immiscible with the polymeric film-forming material. In a preferred embodiment, particles of intended internal phase material are added to the manufacturing vehicle, individually, in a particle-at-a-time manner. The particles of intended internal phase material usually have a size range of from about 200 microns to about 10,000 microns, with a preferred size range of from about 1,000 microns to about 5,000 microns. Intended internal phase material is usually liquid, but particulate solid materials can also be encapsulated by the novel process, as will be described hereinafter where a solid particle can cause local precipitation of polymer in the vehicle into which it is cast, thus sheathing itself.

Temperatures at which the encapsulation process of this invention is conducted can vary greatly, both as regards change in temperature during the performance of an encapsulation, and as regards initial and final temperatures of operation. High or low extremes in operating temperature may affect the rate or degree of capsule wall material precipitation. Apart from those effects, practice of the subject encapsulating process is substantially independent of temperature, as it is the physical state of the materials which is important. Without other limitations which may be inherent in a particular system of materials for encapsulation, the obvious limiting temperatures are (a) the temperature at which a component in the system first boils, and (b) the temperature at which a component in the system first freezes or becomes so viscous as to make operations difficult. Ambient temperature is usually the most convenient operating temperature and will be utilized in all of the examples included hereinafter, the materials being chosen accordingly.

Liquid to serve as a manufacturing vehicle for the manufacture of capsules which contain a particular internal phase must be selected according to the above-specified miscibility criteria. In the case of a liquid to be encapsulated, the intended internal phase and the manufacturing vehicle form what can be considered to be a solvent pair. Below is a listing of a few examples of solvent pairs which can be used to practice the subject invention. Either of the liquids in each example pair can be used as the manufacturing vehicle in a process to encapsulate the other member of the pair.

SOLVENT PAIRS

Water _____ Acetone.
Water _____ Ethanol.
Water _____ Dimethylformamide.
Water _____ Tetrahydrofurane.
Water _____ Dimethylacetamide.
Heptane _____ Acetone.
Cyclohexane _____ Acetone.

Polymeric material for use in the practice of this invention is selected to be soluble in the manufacturing vehicle and insoluble in the material to be encapsulated. More than one kind of polymeric material can be dissolved in the same manufacturing vehicle for precipitation to form capsule walls. A few examples of polymeric film-forming materials available for use in the practice of this invention include poly(ethyleneimine); poly(vinylmethylether-co-maleic anhydride); poly(vinyl pyrrolidone); poly(styrene-co-maleic anhydride); polyacrylic acid copolymers; and polyvinylchloride copolymers. The phenomenon of emergence of the solid precipitate is strictly local to the particle to be encapsulated, and the conditions in one area of the vehicle may be different from those in the remaining portion of the vehicle at the same instant. This is an essential difference over the en masse encapsulation processes disclosed in the cited references.

DESCRIPTION OF PREFERRED EMBODIMENTS

A general disclosure of the subject matter of this invention having been made hereinbefore, further disclosure will now be provided describing specific embodiments of the invention. It should be understood that the following examples are presented to enable an understanding of the invention and an indication of its broad scope. The examples are not intended to limit the invention in any way.

Example I.—In this example, aqueous acid solution was encapsulated in an aqueous manufacturing vehicle. The manufacturing vehicle was prepared by dissolving, in 87 grams of water, 13 grams of poly(styrene-co-maleic anhydride) material. The poly(styrene-co-maleic anhydride) had an average molecular weight of 2,300 and an acid number of 245 (determined as the milligrams of potassium hydroxide required to neutralize one gram of the material), such as the material sold by Sinclair Petrochemicals, Incorporated, Channelview, Tex., United States of America, having the designation "1430." The manufacturing vehicle, once prepared, was slowly agitated, and 13 percent, by weight, aqueous acetic acid was added to the vehicle in a dropwise manner to serve as intended internal phase material for this example. The slow agitation moved the droplets away from the dropping station. As each droplet of acetic acid solution contacted the manufacturing vehicle, poly(styrene-co-maleic anhydride) material was precipitated around it as a capsule wall, growth in the thickness of the wall proceeding rapidly at first and then declining as diffusion of the acetic acid through the forming capsule wall decreased. Addition of droplets of the acetic acid was continued until 10 grams of the intended internal phase had been dispersed into the manufacturing vehicle, and then slow agitation of the system of capsules in manufacturing vehicle was permitted to continue for fifteen minutes until growth of walls ceased. Agitation was then stopped, supernatant manufacturing vehicle was decanted, and the capsules were washed several times with water and were dried in air.

Example II.—This example demonstrates the use, as capsule wall material, of a water-soluble, hydrogen-bonded complex of two polymeric materials. The intended internal phase material was aqueous acetic acid solution. Solutions of the two polymeric materials were prepared as follows: (a) 40 grams of poly(vinyl pyrrolidone) material was dissolved in 160 grams of water. The poly(vinyl pyrrolidone) used in this example had an average molecular weight of about 360,000, such as the material sold by General Aniline and Film Corporation, New York, N.Y., United States of America, having the designation "K-90"; (b) 26 grams of poly(styrene-co-maleic anhydride) as specified in Example I was dissolved in 174 grams of water. The two solutions were then mixed together and agitated for a few minutes to permit formation of the complex of the polymeric materials, which is completely in solution. The resulting clear solution served as manufacturing vehicle for this example. Aqueous acetic acid (13 percent, by weight) was then added, in dropwise manner, to the slowly agitated manufacturing vehicle until 60 grams of the intended internal phase material had been dispersed into the manuafacturing vehicle. Formation and growth of capsule walls about each droplet of internal phase material proceeded as in Example I, the capsule-wall-forming polymeric material being rendered water-insoluble at the low pH of the internal phase material. The capsule-manufacturing process was completed as described in Example I.

Example III.—The same kinds of materials were used in this example as were used in Example II, and solution concentrations were also the same. In this example, however, the aqueous acetic acid solution was used as the manufacturing vehicle, and the solution of polymeric material was the intended internal phase and was encapsulated. It should be noted that this example describes an embodiment of the subject invention wherein capsule wall material is provided by the intended internal phase material and not by the manufacturing vehicle. An aqueous solution consisting of 10 percent, by weight, poly(vinyl pyrrolidone) and 6.5 percent poly(styrene-co-maleic anhydride—the materials as specified in Example II—was added, drop by drop, to 100 milliters of slowly-agitated, aqueous, 13 percent, by weight, acetic acid. Capsules containing the aqueous solution of polymeric materials were formed and isolated, and their walls were dried by the technique described in Examples I and II.

Example IV.—This example describes an embodiment of the invention wherein a non-aqueous liquid was encapsulated and precipitation of polymeric materials occurred from both the intended internal phase material and the manufacturing vehicle. A manufacturing vehicle was prepared by dissolving, in about 50 grams of acetone, 50 grams of poly(ethylene imine) characterized by having a molecular weight of about 1,800, such as the material sold by Dow Chemical Company, Midland, Mich., United States of America, having the designation "Montrek 18." The intended internal phase material for this experiment was a 10 percent, by weight, solution of poly(vinylmethylether-co-maleic anhydride) in acetone. The poly(vinylmethylether-co-maleic anhydride) used had a specific viscosity of 1.0 to 1.4 in 1 percent, by weight, ethyl methyl ketone at 25 degrees centigrade, a softening point temperature of 200 to 225 degrees centigrade, and a specific gravity of 1.37, such as the material sold by General Aniline and Film Corporation, New York, N.Y., United States of America, having the designation "Gantrez AN." The intended internal phase material was added, drop by drop, to the manufacturing vehicle solution of poly(ethyleneimine) in acetone under slow agitation. As the droplets contacted the manufacturing vehicle, a capsule wall of precipitated polymeric material formed around each droplet at the interface between the droplets and the manufacturing vehicle.

Example V.—The same kind of materials were used in this example as were used in Example IV. In this example, however, the 10 percent, by weight, solution of poly(vinylmethylether-co-maleic anhydride) in acetone was used as the manufacturing vehicle. The intended internal phase material for this example was 38 percent, by weight, poly(ethyleneimine) in acetone. The intended internal phase material was added to the manufacturing vehicle under agitation in the same manner as in Example IV. The capsules were washed with acetone prior to isolation and drying.

Example VI.—In this example, the manufacturing vehicle was prepared by adding 30 grams of water to 30 grams of a 45 percent, by weight, aqueous solution of a low-molecular-weight carboxyl-containing, acrylic copolymer resin sold as "Carboset 511" by B. F. Goodrich Chemical Company, Cleveland, Ohio, United States of America. Five grams of intended internal phase material —10 percent, by weight, aqueous acetic acid solution— was added to the manufacturing vehicle under agitation. As described in previous examples, the capsules were then isolated from the manufacturing vehicle and dried.

Example VII.—Solid particles of intended internal phase material were encapsulated in this example. The manufacturing vehicle was the same as the manufacturing vehicle in Example II. The intended internal phase material was silica gel particles which had been steeped in aqueous acetic acid solution and then dried on their outside surfaces. Acetic acid drawn out of the steeped silica gel particles caused the formation of wall material thereabout. Ten grams of the silica particles were added, with agitation, to the manufacturing vehicle, and the agitation was maintained for about ten minutes before the capsules containing individual silica gel particles, perhaps with some residual acetic acid, were isolated and dried.

Capsules which contain such solid internal phase materials can also be prepared by utilizing, as the intended internal phase material, a slurry or dispersion of the solid in a liquid which is miscible with the manufacturing vehicle and capable of precipitating the polymeric capsule-wall-forming material.

What is claimed is:

1. A process for preparing minute capsules comprising the step of introducing particles of a material to be encapsulated into an agitated liquid solution of polymeric material in a manufacturing vehicle, all materials being so selected that the material to be encapsulated is miscible with the manufacturing vehicle and is substantially immiscible with the polymeric material and the particles of material to be encapsulated cause precipitation of the polymeric material around said particles to form a capsule wall.

2. A process for encapsulating minute particles in a capsule wall of precipitated polymeric material, comprising the step of introducing the particles into a liquid manufacturing vehicle, which vehicle is miscible with the particles and has, in solution, the polymeric material, substantially immiscible with the particles, such introduction changing the solubility characteristics of the solution and causing precipitation of the polymeric material about each particle to form a capsule wall therearound.

3. A method for preparing, in a liquid environment, minute capsules having walls of polymeric material and containing particles of an intended internal phase material substantially immiscible with the polymeric material, comprising the steps of:
   (a) dissolving a polymeric capsule-wall-forming material in a liquid to form a manufacturing vehicle; and
   (b) dispersing, into the manufacturing vehicle, particles of the intended internal phase material, said particles being selected to be miscible with the liquid of the manufacturing vehicle and to change the solubility characteristics of said manufacturing vehicle, said particles being substantially immiscible with the polymeric capsule-wall-forming material, to cause precipitation of the polymeric material about each particle to form a capsule wall.

4. A process for individually encapsulating minute liquid particles in a precipitated solid film of a combination of at least two kinds of polymeric material, comprising the steps of:
   (a) dispersing the particles, having at least one kind of polymeric material in solution, in an agitated manufacturing vehicle comprising a solvent and, in solution, at least one other kind of polymeric material, the particles and the solvent of the manufacturing vehicle being mutually miscible and the polymeric materials being substantially immiscible and precipitated in a solution combination of the particles and the manufacturing vehicle; and
   (b) continuing agitation of the liquid vehicle to maintain dispersion of the particles and to allow polymeric material, precipitated about each particle, to grow firm capsule walls.

5. A process for individually encapsulating, in a liquid manufacturing environment, minute, liquid particles in a film of polymeric material, which polymeric material has been precipitated from solution in the liquid particles, comprising the steps of:
   (a) dispersing the liquid particles, comprising a solvent and capsule-wall-forming polymeric material in solution therein, in an agitated liquid manufacturing vehicle, which manufacturing vehicle is miscible with said solvent and substantially immiscible with said polymeric material to cause the polymeric material to precipitate from solution and deposit at the interface of each particle and the vehicle; and
   (b) continuing agitation of the liquid manufacturing vehicle to maintain dispersion of the particles with the interface deposit, to allow the polymeric material precipitated about each particle to become firm capsule walls.

References Cited

UNITED STATES PATENTS

| 3,155,590 | 11/1964 | Miller et al. | 252—316 X |
| 3,173,878 | 3/1965 | Reyes | 252—316 |
| 3,415,758 | 12/1968 | Powell et al. | 252—316 |

RICHARD D. LOVERING, Primary Examiner

U.S. Cl. X.R.

117—100 A, 100 B, 100 C, 100 S; 264—4